C. F. MADDEN.
CLEAN-OUT PLUG.
APPLICATION FILED JUNE 22, 1907.
952,078.
Patented Mar. 15, 1910.
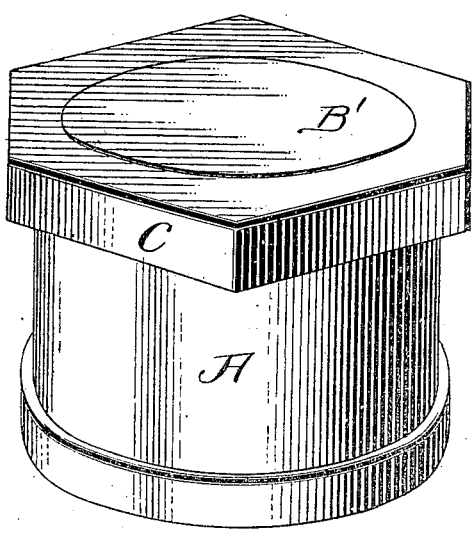
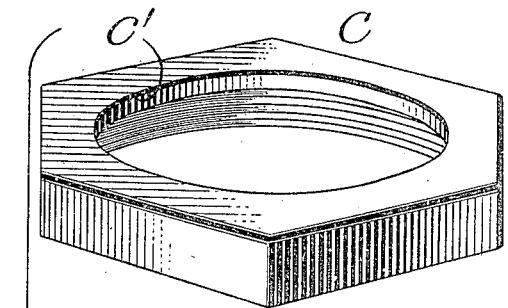
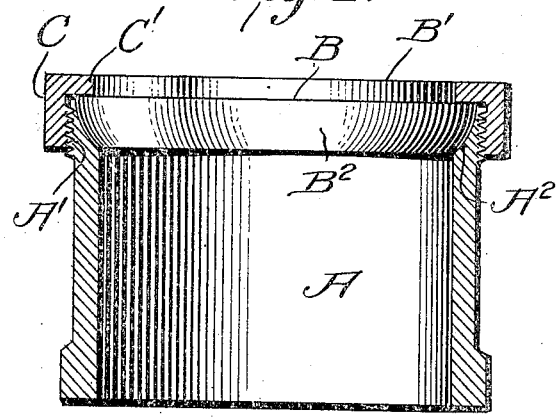
Witnesses
Oliver W. Holmes
E. B. McBath
Inventor
C. F. Madden,
By O'Meara & Birch
Attorneys

UNITED STATES PATENT OFFICE.

CHARLES F. MADDEN, OF GREEN BAY, WISCONSIN.

CLEAN-OUT PLUG.

952,078.

Specification of Letters Patent.

Patented Mar. 15, 1910.

Application filed June 22, 1907. Serial No. 380,312.

*To all whom it may concern:*

Be it known that I, CHARLES F. MADDEN, a citizen of the United States, residing at Green Bay, in the county of Brown and State of Wisconsin, have invented a new and useful Improvement in Clean-Out Plugs, of which the following is a specification.

This invention relates to a clean out plug, and is especially designed for use in connection with sewers, although it is adapted for use in connection with any pipe line where cleaning and inspection plugs are desirable, and where it is necessary for sanitary or other reasons that said plug should be air tight.

Clean out plugs for sewers are sometimes provided with a packing for the cover but this is objectionable as the packing will in time dry out and become porous and therefore permits escape of gas from the sewer through the packing affording less protection than if no packing was employed. Moreover, it frequently occurs that a plumber will remove the cover and old packing from such a clean out plug and having no new packing material with him he simply replaces the cover without the packing.

The object of the invention is to avoid both of the above dangers by providing a clean out plug and cover in which no packing whatever is required.

The invention consists of the novel features of constructions hereinafter fully described, pointed out in the claims, and shown in the accompanying drawings, in which, Figure 1 is a perspective view of one of my plugs sealed air tight. Fig. 2 is a vertical section through said plug, the cover being shown in side elevation. Fig. 3 is a detail perspective view of the clean out plug, cover and lock nut, the parts being separated from each other.

In these drawings A represents a cylindrical plug having exterior threads A' at its upper end and a smooth concave seat A² constituting a spherical zone, formed upon the inner side of the plug adjacent its upper end. A cover B is provided upon its upper face with a circular elevated central portion B' and a convex smooth under face B², constituting a spherical zone coincident with zone A² of the plug, the face B² and the concave seat A² being ground accurately to fit. A lock nut C polygonal in outline is provided with an inwardly extending flange C' adapted to fit over the elevated portion B' of the cover B, the flange resting upon the marginal portion of the said cover. The nut C is interiorly threaded to engage the threads A' of the plug A.

In assembling the parts, the cover B is seated in the seat A² and the nut is fitted over the cover and by means of a suitable wrench is screwed down tight upon the threads A', the flange C' bearing upon the cover and forcing the same into contact with the seat A². The flange C' also fits snugly the central raised portion B' thereby aiding in sealing the plug.

It will be observed that the coacting spherical zones of the plug and cover permit universal movement of the cover in the seat to a considerable extent, so that however crookedly the cover may be applied to its seat, it straightens out accurately to interfit with the seat, when pressed upon by the lock nut, so that binding of the cover in improper position and wedging of the cover in its seat is practically impossible.

Having thus fully described my invention, what I claim as new and desire to secure by Letters Patent, is:—

1. A clean out plug comprising a body having an open top, interiorly provided with a concave seat of parti-spherical configuration, a cover detachable from the body to open it having a convex lower edge surface coincident with the parti-spherical seat, whereby the cover may move universally while in contact with its seat, and means for forcing the cover upon its seat.

2. In a clean out plug, a body having an open top interiorly provided with a concave, parti-spherical seat, and exteriorly threaded, a cover detachable from the body to open it having a convex parti-spherical lower edge, coincident with the parti-spherical seat, whereby the cover may move universally while in contact with its seat, and a part screwed on the threads of the body engaging the top of the cover adjacent its edge, throughout its periphery, to force the cover into proper seating position on the body when said part is applied to the body.

3. In a clean out plug, a body having an open top interiorly provided with a concave parti-spherical seat, and exteriorly screw threaded, a cover bodily detachable from the body to open it, having a convex parti-spherical lower edge coincident with the parti-spherical seat, and having a central cylindrical boss upon its top, leaving upon the margin of the top a flat space, and a nut engaging the exterior threads of the body provided with an inwardly extending flange adapted nicely to cover the flat rim portion of the cover, so that when the parts are assembled the boss upon the cover lies flush with the top of the nut.

CHARLES F. MADDEN.

Witnesses:
 JEAN BROWN,
 C. R. ERICHSEN.